(12) United States Patent
Lee et al.

(10) Patent No.: US 11,349,114 B2
(45) Date of Patent: May 31, 2022

(54) ANODELESS COATING LAYER FOR ALL-SOLID-STATE BATTERY AND ALL-SOLID-STATE BATTERY INCLUDING ANODELESS COATING LAYER

(71) Applicants: Samsung Electronics Co., Ltd., Suwon-si (KR); Samsung SDI Co., Ltd., Yongin-si (KR)

(72) Inventors: Yonggun Lee, Suwon-si (KR); Toshinori Sugimoto, Hwaseong-si (KR); Yuichi Aihara, Yokohama (JP); Saebom Ryu, Suwon-si (KR); Dongmin Im, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 269 days.

(21) Appl. No.: 16/674,037

(22) Filed: Nov. 5, 2019

(65) Prior Publication Data
US 2020/0144599 A1    May 7, 2020

(30) Foreign Application Priority Data

Nov. 7, 2018  (KR) .................. 10-2018-0136041

(51) Int. Cl.
*H01M 4/137* (2010.01)
*H01M 4/60* (2006.01)
*H01M 10/0525* (2010.01)
*H01M 4/36* (2006.01)

(52) U.S. Cl.
CPC .......... *H01M 4/137* (2013.01); *H01M 4/366* (2013.01); *H01M 4/602* (2013.01); *H01M 10/0525* (2013.01)

(58) Field of Classification Search
None
See application file for complete search history.

(56) References Cited

U.S. PATENT DOCUMENTS

| 9,786,950 | B2 | 10/2017 | Lee et al. |
| 10,340,524 | B2 | 7/2019 | Lee et al. |
| 10,468,718 | B2 | 11/2019 | Lee et al. |
| 2011/0049745 | A1 | 3/2011 | Katayama et al. |

(Continued)

FOREIGN PATENT DOCUMENTS

| KR | 1020160029599 A | 3/2016 |
| KR | 1020160118958 A | 10/2016 |

(Continued)

OTHER PUBLICATIONS

Machine Translation of Korean Patent Publication No. 20180015841 (Year: 2018).*

*Primary Examiner* — Wyatt P McConnell
(74) *Attorney, Agent, or Firm* — Cantor Colburn LLP

(57) ABSTRACT

An anodeless coating layer for an all-solid battery, the anodeless coating layer includes: an anode active material capable of forming an alloy with lithium or a compound with lithium; and a binder, wherein the binder includes a block copolymer including a conductive domain, a non-conductive domain, or a combination thereof, and wherein the conductive domain includes an ion-conductive domain, an electron-conductive domain, or a combination thereof.

27 Claims, 7 Drawing Sheets

(56) References Cited

U.S. PATENT DOCUMENTS

2016/0087306 A1* 3/2016 Lee .................. H01M 10/0525
                                                    429/317
2016/0294005 A1   10/2016 Lee et al.
2019/0157723 A1    5/2019 Suzuki et al.

FOREIGN PATENT DOCUMENTS

| KR | 101747865 A    | 6/2017 |
| KR | 1020170083387 A | 7/2017 |
| KR | 101850901 B1   | 4/2018 |
| KR | 1020180038831 A | 4/2018 |
| KR | 1020180046574 A | 5/2018 |
| KR | 1020180076709 A | 7/2018 |

* cited by examiner

ANODELESS COATING LAYER FOR ALL-SOLID-STATE BATTERY AND ALL-SOLID-STATE BATTERY INCLUDING ANODELESS COATING LAYER

CROSS-REFERENCE TO RELATED APPLICATION

This application claims priority to and the benefit of Korean Patent Application No. 10-2018-0136041 filed on Nov. 7, 2018, and all the benefits accruing therefrom under 35 U.S.C. § 119, the content of which is incorporated by reference herein, in its entirety.

BACKGROUND

1. Field

The present disclosure relates to an anodeless coating layer for an all-solid battery and an all-solid battery including the anodeless coating layer.

2. Description of the Related Art

The use of lithium as an anode active material has been proposed to increase an energy density of all-solid batteries. Nonetheless, there remains a need for improved materials to avoid problems such a lithium dendrite. The lithium dendrite may cause a short circuit or a deterioration in the capacity of the battery. Accordingly, in practice, it is difficult to put lithium to practical use as an anode active material.

Although methods of suppressing the deposition and growth of lithium dendrites have been proposed, there remains a need to improve the characteristics of all-solid batteries.

SUMMARY

Provided are an anodeless coating layer for an all-solid battery and an all-solid battery including the anodeless coating layer. The anodeless coating layer may improve characteristics of the all-solid battery.

Additional aspects will be set forth in part in the description which follows and, in part, will be apparent from the description, or may be learned by practice of the presented embodiment.

According to an aspect of an embodiment, an anodeless coating layer for an all-solid battery includes an anode active material capable of forming an alloy with lithium or a compound with lithium; and a binder, wherein the binder may include a block copolymer including a conductive domain, a non-conductive domain, or a combination thereof, and wherein the conductive domain includes an ion-conductive domain, an electron-conductive domain, or a combination thereof.

According to an aspect of another embodiment, an all-solid battery includes: a cathode including a cathode current collector and a cathode active material layer; an anode current collector; the anodeless coating layer on the anode current collector; and a solid electrolyte disposed between the cathode active material layer and the anodeless coating layer.

BRIEF DESCRIPTION OF THE DRAWINGS

These and other aspects will become apparent and more readily appreciated from the following description of the embodiments, taken in conjunction with the accompanying drawings in which.

DETAILED DESCRIPTION

Figure 1:
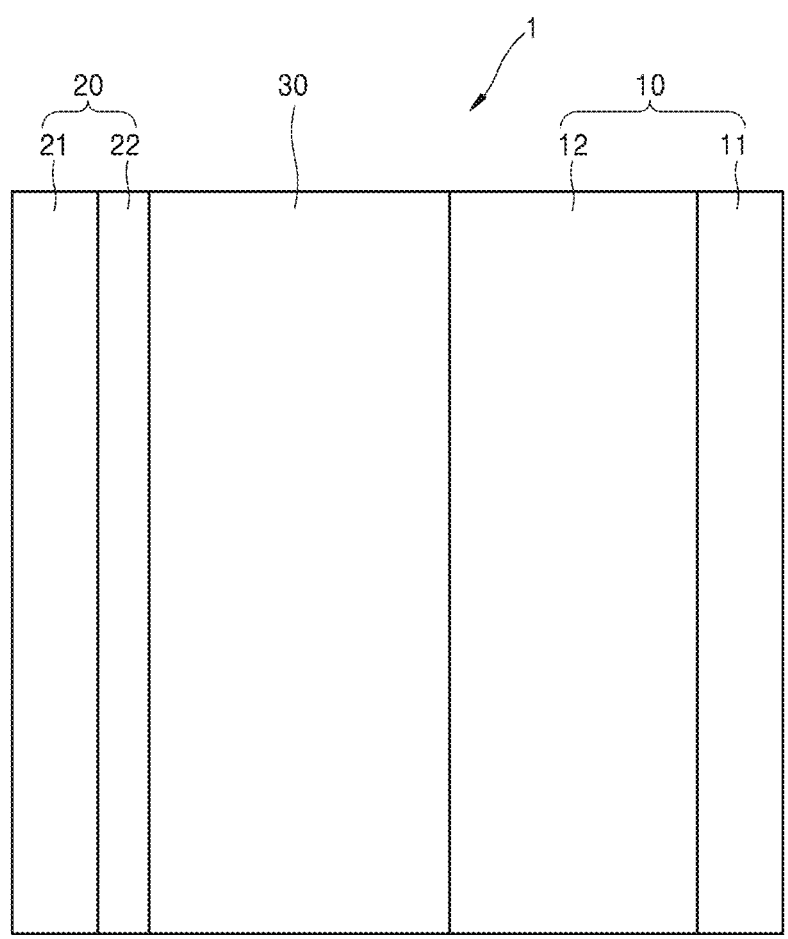
FIG. 1 is a schematic cross-sectional view of an embodiment of an all-solid battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the disclosed embodiment is merely described below, by referring to the figures, to explain aspects.

It will be understood that if a particular element is referred to as being "disposed" between two other elements, the particular element may be directly on one or both of the two other elements, or one or more intervening elements may be present between the particular element and one or both of the other two elements.

It will be understood that when an element is referred to as being "on" another element, it can be directly on the other element or intervening elements may be present therebetween. In contrast, when an element is referred to as being "directly on" another element, there are no intervening elements present. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Methods of using lithium or a lithium alloy as an anode active material include a method in which lithium or a lithium alloy is used as an anode active material layer and or a method in which an anode active material layer is not formed on an anode current collector prior to a first charge. In the method in which an anode active material layer is not formed on an anode current collector prior to a first charge, a solid electrolyte may be formed on the anode current collector as the batter is charged, and lithium deposited at an interface between the anode current collector and the solid electrolyte may be used as an active material. The anode current collector may include a metal that forms neither an alloy nor a compound with lithium.

However, when lithium is used as an anode active material, lithium metal may be deposited on the anode while charging as the battery is charged. When lithium is used as an anode active material, lithium metal may be deposited as a lithium layer. When an anode active material layer is not formed, lithium metal may be deposited on the anode current collector. When charging and discharging an all-solid secondary battery repeatedly, lithium metal deposited on the anode may result in lithium dendrite growth at a gap within the solid electrolyte.

An anodeless coating layer for an all-solid battery and a method of charging the all-solid battery according to an embodiment will be described in detail with reference to the attached drawings.

An anodeless coating layer for an all-solid battery includes an anode active material capable of forming an alloy with lithium or a compound with lithium; and a binder, wherein the binder includes a block copolymer including a conductive domain, a non-conductive domain, or a combination thereof, and the conductive domain includes an ion-conductive domain, an electron-conductive domain, or a combination thereof.

In the all-solid battery including lithium as an anode active material, an anode active material layer may not be formed on an anode current collector during manufacture, and an anodeless coating layer and a solid electrolyte may be sequentially formed on the anode current collector. In the all-solid battery, lithium deposited at an interface between the anode current collector and the anodeless coating layer during charge may be used as an active material.

The term "anodeless coating layer for an all-solid battery" as used herein refers to a coating layer formed on a current collector in an anodeless all-solid battery in which an anode active material layer was initially not present at the time of the manufacture of the battery, e.g., before a first charge. In an all-solid battery having an anodeless coating layer, the anodeless coating layer may be intercalated with lithium as the battery is charged. After exceeding a charge capacity of the anodeless coating layer, a lithium metal layer may form between an anode current collector and the anodeless coating layer.

The all-solid battery may be an all-solid secondary battery.

A ratio of a charge capacity of the cathode active material layer to a charge capacity of the anodeless coating layer may satisfy Equation 1:

$$0.002 < b/a < 0.5 \qquad \text{Equation 1}$$

wherein, a indicates a charge capacity (e.g., in milliampere-hours (mAh)) of the cathode active material layer, and b indicates a charge capacity (e.g., in mAh) of the anodeless coating layer. The charge capacity of the cathode active material layer may be much greater, e.g., 2 times to 100 times, or 4 times to 50 times, than the charge capacity of the anodeless coating layer.

Upon discharge, lithium in the anodeless coating layer and the lithium metal layer may be ionized and migrate toward a cathode. As a result, lithium may be used as an anode active material, and the energy density of the battery may increase. Also, the anodeless coating layer may cover the lithium metal layer such that the anodeless coating layer may serve as a protective layer for the lithium metal layer. Accordingly, the anodeless coating layer may suppress deposition and/or growth of a dendrite, which in turn may suppress a short circuit and thus may minimize deterioration in the capacity of the all-solid battery as well as improve characteristics of the all-solid secondary battery.

The anodeless coating layer may include an anode active material and a binder, and may be stabilized on the anode current collector.

In a case where polyvinylidene fluoride is used as a binder, lithium ion conductivity of the anodeless coating layer may be insufficient because polyvinylidene fluoride is a non-conductive binder. Thus, there is a need for improving lithium ion conductivity of the anodeless coating layer such that lithium in the lithium metal layer that forms on a back side of the anodeless coating layer, e.g., proximate the current collector, and the anodeless coating layer may be ionized and efficiently migrate toward the cathode upon discharge.

Accordingly, by forming an anodeless coating layer, one may increase lithium ion conductivity of a lithium metal layer, and the anodeless coating layer, by forming a lithium ion conduction pathway in the anodeless coating layer. Moreover, one may reduce resistance using a block copolymer containing a conductive domain, a non-conductive domain, or a combination thereof as a conductive binder. As a result, the all-solid battery may exhibit an improved lifespan and improved capacity characteristics.

A conductive domain in a block copolymer may affect ionic conductivity and/or electronic conductivity of the block copolymer, and a non-conductive domain, if present, may affect mechanical or structural properties of the block copolymer.

The anodeless coating layer with a conductive block copolymer that includes an ion-conductive domain having a conductivity as a binder may thereby improve lithium ion conductivity. The anodeless coating layer may further improve the conductivity compared to a block copolymer containing a non-conductive domain. Also, the anodeless coating layer containing the block copolymer may have an excellent binding force to a current collector, thereby suppressing detachment of the anodeless coating layer from the anode current collector which in turn may suppress short circuits.

The anodeless coating layer may be prepared, for example, by providing an anode slurry, in which materials for forming the anodeless coating layer are dispersed, coating an anode current collector with the anode slurry, and drying the anode slurry. A content of the binder may be in a range of about 0.3 parts by weight to about 15 parts by weight, or for example, about 1 part by weight to about 10 parts by weight, based on 100 parts by weight of the total weight of the anode active material.

A thickness of the anodeless coating layer may be in a range of about 1 micrometer ($\mu$m) to about 20 $\mu$m, or for example, about 1 $\mu$m to about 10 $\mu$m. When a thickness of the anodeless coating layer is within any of these ranges, the performance of the all-solid battery may further improve.

The anode active material may be in the form of particles. An average particle diameter of the anode active material may be in a range of about 4 $\mu$m or less, or for example, in a range of about 0.01 $\mu$m to about 4 $\mu$m, in a range of about 0.1 $\mu$m to about 4 $\mu$m, or in a range of about 1 $\mu$m to about 3 $\mu$m. The anode active material may include amorphous carbon, gold (Au), platinum (Pt), palladium (Pd), silicon (Si), silver (Ag), aluminum (Al), bismuth (Bi), tin (Sn), zinc (Zn), or a combination thereof.

The anode active material may include amorphous carbon.

The anode active material may be, for example, a mixture of amorphous carbon and gold (Au), platinum (Pt), palladium (Pd), silicon (Si), silver (Ag), aluminum (Al), bismuth (Bi), tin (Sn), zinc (Zn), or a combination thereof. In an embodiment, a mixing weight ratio of amorphous carbon to gold (Au), platinum (Pt), palladium (Pd), silicon (Si), silver (Ag), aluminum (Al), bismuth (Bi), tin (Sn), zinc (Zn), or a combination thereof, may be in a range of about 3:1 to about 1:1.

If the anode active material contains silicon, the silicon may become amorphized after the initial charge/discharge.

An anode active material according to an embodiment may be, for example, a mixture of amorphous carbon and silicon or a mixture of amorphous carbon and silver.

The anode active material may include a mixture of a first particle and a second particle, wherein the first particle may include amorphous carbon and the second particle may include a metal, a semiconductor, or a combination thereof, wherein a content of the second particle may be in a range of about 8 parts by weight to about 80 parts by weight, for example, about 10 parts by weight to about 75 parts by weight, or for example, about 10 parts by weight to about 60 parts by weight, based on 100 parts by weight, of a total weight of the mixture.

A thin film including an element alloyable with lithium may be provided on the anode current collector, and the thin film may be disposed between the anode current collector and the anodeless coating layer. A thickness of the thin film may be in a range of about 1 nanometer (nm) to about 500 nm, or in a range of about 50 nanometer to about 300 nm.

A metal layer may be included and disposed between the anode current collector and the anodeless coating layer, and the metal layer may include lithium or a lithium alloy. The metal layer may be formed between the anode current collector and the anodeless coating layer.

The metal layer may be purchased or prepared in advance. The metal layer may serve as a lithium reservoir, and thus, characteristics of the all-solid battery may improve. A thickness of the metal layer may be in a range of about 1 $\mu$m to about 200 $\mu$m, or in a range of about 20 $\mu$m to about 120 $\mu$m.

The anode current collector, the anodeless coating layer, and a region between the anode current collector and the anodeless coating layer may be a lithium-free region that does not include lithium in an initial state or a state after discharge of the all-solid secondary battery.

The all-solid battery may be a lithium battery, for example, a lithium secondary battery. Also, the all-solid battery according to an embodiment may be an all-solid secondary battery.

The all-solid battery may be charged to a level exceeding a charge capacity of the anodeless coating layer. A charge capacity of the all-solid battery may be in a range of about 2 times to 500 times greater than the charge capacity of the anodeless coating layer. In early charging, e.g., cycles 1 to 5, the anodeless coating layer may be intercalated with lithium. After exceeding the charge capacity of the anodeless coating layer, lithium may be deposited on a back side of the anodeless coating layer. A metal layer may be formed from the deposited lithium. Upon discharge, lithium in the anodeless coating layer and the metal layer may be ionized and migrate toward a cathode. In this instance, lithium may be used as an anode active material. Also, the anodeless coating layer may cover the metal layer such that the anodeless coating layer may serve as a protective layer for the metal layer and may suppress deposition growth of dendrites, and may also suppress short circuits, and thus, minimize the deterioration in the capacity of the all-solid secondary battery as well as improve characteristics of the all-solid battery.

In the block copolymer according to an embodiment, a conductive domain may be a polymer including an ion-conductive repeating unit, a mixture of a polymer including an ion-conductive repeating unit and a crosslinked network phase, a polymer including an electron-conductive repeating unit, or a combination thereof.

The polymer including an ion-conductive repeating unit may be polyethylene oxide, polysilsesquioxane, poly(ethylene glycol)methyl ether methacrylate (POEM), polysiloxane, polypropylene oxide, polymethyl methacrylate, polyethyl methacrylate, polydimethyl siloxane, polyacrylic acid, polymethacrylic acid, polymethyl acrylate, polyethyl acrylate, poly(2-ethylhexyl acrylate), polybutyl methacrylate, poly2-ethylhexyl methacrylate, polydecylacrylate, polyethylene vinylacetate, polyimide, polyamine, polyamide, polyalkyl carbonate, polynitrile, polyphosphazine, or a combination thereof.

A block copolymer in which a conductive domain may include a mixture of a polymer including an ion-conductive repeating unit and a crosslinked network phase is disclosed in Korean Patent KR 10-1747865, the content of which is incorporated herein in its entirety by reference. The crosslinked network phase obtained through reaction of a crosslinkable reactive group-including compound may include a product of chemical bonding of the crosslinkable reactive group-including compound. Here, the chemical bonding refers to covalent bonding. The crosslinked network phase may be physically bound to the polymer including the ion-conductive repeating unit. The physical binding refers to binding via a non-covalent bond.

The crosslinkable reactive group-including compound may be a multi-functional polymerizable monomer with a crosslinkable reactive group, an inorganic particle with a crosslinkable reactive group, an ionic liquid with a crosslinkable reactive group, or a combination thereof. Accordingly, the crosslinked network phase may include a reaction product of these crosslinkable reactive group-including compounds.

For example, the crosslinkable reactive group-including compound may include a lithium ion-conductive unit, a hydrophilic unit, or a combination thereof. When preparing an electrolyte using a crosslinkable reactive group-including compound including these units, crosslinking of the crosslinkable reactive group-including compound may occur in an ion-conductive domain. Accordingly, the resulting electrolyte may include a block copolymer with the ion-conductive domain including the crosslinked network phase.

For example, the multi-functional polymerizable monomer with the crosslinkable reactive group may be polyethylene glycol diacrylate, polyethylene glycol dimethacrylate, ethoxylated trimethylolpropane triacrylate, ethoxylated trimethylolpropane trimethacrylate, 1,4-butadeine, 1,6-hexadiene, allyl acrylate, acrylated cinnamate, isoprene, butadiene, chloroprene, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, acrylic acid, methacrylic acid, 2-(meth)acryloyloxy acetic acid, 3-(meth)acryloyloxy propionic acid, 4-(meth)acryloyloxy butyric acid, itaconic acid, maleic acid, 2-isocyanatoethyl (meth)acrylate, 3-isocyanatopropyl (meth)acrylate, 4-isocyanatobutyl (meth)acrylate, (meth)acrylamide, N-vinylpyrrolidone, ethylene glycol dimethacrylate, diethylene glycolmethacrylate, triethylene glycol dimethacrylate, trimethylol propane trimethacrylate, trimethylene propane triacrylate, 1,3-butanediol di(meth)acrylate, 1,6-hexanediol di(meth)acrylate, N-vinyl caprolactam, or a combination thereof.

Examples of the block copolymer in which a conductive domain may include a mixture of a crosslinked network phase and a polymer including an ion-conductive repeating unit may include i) a block copolymer containing a polystyrene first block, a second block including a reaction product of one of polyethylene glycol diacrylate and polyethylene glycol dimethacrylate, and polyethylene oxide; and ii) a block copolymer containing a polystyrene first block, a second block including a reaction product of one of polyethylene glycol diacrylate and polyethylene glycol dimethacrylate, and polyethylene oxide, and a polystyrene third block.

The polymer including an electron-conductive repeating unit may be polyaniline (PANI), polypyrrole (PPy), poly(3,4-ethylenedioxythiophene) (PEDOT), poly(3,4-ethylenedioxythiophene):poly(styrene sulfonate) (PEDOT:PSS), or a combination thereof.

The non-conductive domain may provide mechanical properties of the block copolymer, where the non-conductive domain may be a structural domain, a rubber domain, an olefin domain, a structural domain having an organic-inorganic silicon structure, or a combination thereof.

In an embodiment, the structural domain is present as a block in a block copolymer, wherein the structural block includes a plurality of structural repeating units. The blocks of the copolymer including the plurality of structural repeating units may be i) polystyrene, hydrogenated polystyrene, polymethacrylate, poly(methyl methacrylate), polyvinyl pyridine, polyvinyl cyclohexane, polyimide, polyamide, polyethylene, polyisobutylene, polybutylene, polypropylene, poly(4-methyl pentene-1), poly(butylene terephthalate), poly(isobutyl methacrylate), poly(ethylene terephthalate), polydimethyl siloxane, polyacrylonitrile, polymaleic acid, poly maleic anhydride, polymethacrylic acid, poly(tert-butylvinyl ether), poly(cyclohexyl methacrylate), poly(cyclohexyl vinyl ether), polyvinylidene fluoride, polydivinyl benzene, or a combination thereof, or may include ii) a copolymer including at least two repeating units of these polymers.

The rubber domain may have excellent strength, ductility, and elasticity and may contain a rubber block including a plurality of rubber repeating units, wherein the rubber block may be polyisoprene, polybutadiene, polychloroprene, polyisobutylene, polyurethane, or a combination thereof. The block copolymer containing a rubber domain is disclosed in KR 10-2016-0118958 A, the content of which, in its entirety, is incorporated herein by reference. Examples of the block copolymer having the rubber domain may include a block copolymer including a polystyrene first block and a polyisoprene second block; a block copolymer including a polystyrene first block, a polyisoprene second block, and a polystyrene third block; a block copolymer including a polystyrene first block and a polybutadiene second block; and a block copolymer including a polystyrene first block, a polybutadiene second block, and a polystyrene third block.

The olefin domain may be a non-conductive region which is related to mechanical properties such as tensile strength. The olefin domain may contain an olefin block including a plurality of olefin repeating units, and the olefin block may be present in a block copolymer, wherein the block including an olefin repeating unit may be polyethylene, polybutylene, polyisobutylene, polypropylene, or a combination thereof. The block copolymer containing an olefin domain is disclosed in KR 10-2017-0083387 A, the content of which, in its entirety, is incorporated herein by reference. Examples of the block copolymer containing an olefin domain include a polyethylene oxide-polypropylene block copolymer.

The structural domain having an organic-inorganic silicon structure may be related to a strength and mechanical properties of the anodeless coating layer. The block copolymer containing a structural domain is disclosed in KR 10-2016-0029599 A, the content of which, in its entirety, is incorporated herein by reference.

A mixing weight ratio of the conductive domain to the non-conductive domain in the block copolymer may be in a range of about 1:99 to about 99:1, for example about 10:90 to about 90:10, for example about 20:80 to about 20:80.

When the block copolymer is a block copolymer containing an ion-conductive domain and a structural domain, a content of the ion-conductive domain may be in a range of about 55 parts by weight to about 80 parts by weight based on 100 parts by weight of the total weight of the block copolymer. If a content of the ion-conductive domain is within this range, lithium ion conductivity of the anodeless coating layer may be improved, resulting in improvement of migration characteristics of lithium ions toward a cathode upon discharge.

The block copolymer containing an ion-conductive domain and a structural domain may be, for example, a block copolymer containing a polystyrene first block and a second block including polyethylene oxide; a block copolymer containing the polystyrene first block, the second block including polyethylene oxide, and a polystyrene third block; a block copolymer containing the polystyrene first block and a second block including polysilsesquioxane; a block copolymer containing the polystyrene first block, the second block including polysilsesquioxane, and the polystyrene third block; a block copolymer containing the polystyrene first block and a second block including poly(ethylene glycol)methyl ether methacrylate (POEM); a block copolymer containing the polystyrene first block, the second block including POEM, and the polystyrene third block; a block copolymer containing the polystyrene first block and a second block including polysiloxane; a block copolymer containing the polystyrene first block, the second block including polysiloxane, and the polystyrene third block; or a combination of the block copolymers thereof.

According to another aspect, an all-solid battery may include: a cathode including a cathode current collector and a cathode active material layer; an anode current collector; an anodeless coating layer on the anode current collector, the anodeless coating layer including an anode active material capable of forming with lithium an alloy or a compound; and a binder according to an embodiment; and a solid electrolyte disposed between the cathode active material layer and the anodeless coating layer.

Hereinafter, the all-solid battery according to an embodiment will be described in detail with reference to the attached drawings.

Figure 2:
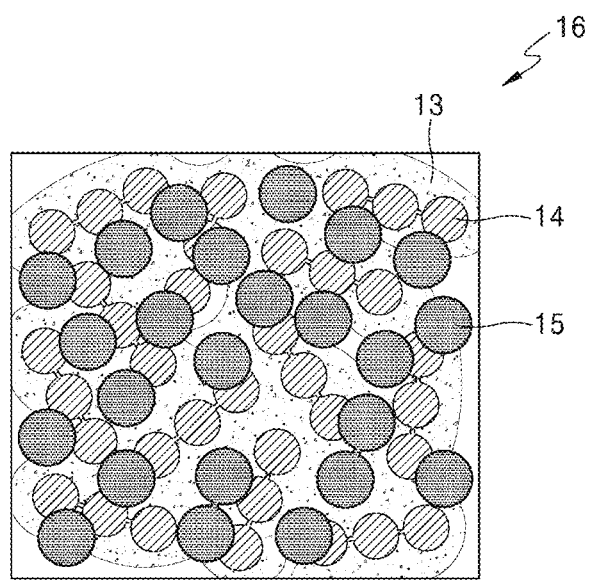
FIG. 2 is a schematic view of an embodiment of an anodeless coating layer.

Referring to FIGS. 1 and 2, a structure of an all-solid secondary battery 1 according to an embodiment will be described. As shown in FIG. 1, the all-solid battery 1 may include a cathode 10, an anode 20, and a solid electrolyte 30.

The cathode 10 may include a cathode current collector 11 and a cathode active material layer 12. Examples of the cathode current collector 11 include a plate or a foil including indium (In), copper (Cu), magnesium (Mg), stainless steel, titanium (Ti), iron (Fe) cobalt (Co), nickel (Ni), zinc (Zn), aluminum (Al), germanium (Ge), lithium (Li), or an alloy thereof. Alternatively, the cathode 10 may not include a current collector 11.

The cathode active material layer 12 may include a cathode active material and a solid electrolyte. The solid electrolyte included in the cathode 10 may be similar to or different from a solid electrolyte included in the solid electrolyte 30.

The cathode active material may be any suitable cathode active material capable of reversible intercalation and deintercalation of lithium ions.

Examples of the cathode active material include lithium salts, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, nickel sulfide, copper sulfide, lithium sulfide, sulfur, iron oxides, vanadium oxides, and the like. The cathode active material may be used alone, or a combination of at least two cathode active materials may be used.

The cathode active material may include a lithium salt of transition metal oxide having a layered rock-salt type structure among the lithium salts. The term "layered rock-salt type structure" as used herein denotes a structure in which an oxygen atom layer and a metal atom layer are alternately and regularly arranged in <111> direction of a cubic rock-salt type structure and the respective atom layer thus forms as a two-dimensional plane. The term "cubic rock-salt type structure" as used herein denotes a sodium chloride-type structure as one of crystal structures in which face-centered cubic lattices respectively formed of anions and cations are shifted by only a half of the side of each unit lattice.

Examples of a lithium salt of a transition metal oxide having a layered rock-salt type structure may be a lithium salt of a ternary transition metal oxide represented by the formula $LiN_xCo_yAl_zO_2$ ("NCA") or $LiNi_xCo_yMn_zO_2$ ("NCM"), wherein $0<x<1$, $0<y<1$, $0<z<1$, and $x+y+z=1$.

When the cathode active material includes the lithium salt of a ternary transition metal oxide having a layered rock-salt type structure, the all-solid secondary battery 1 may have improved energy density and thermal stability.

The cathode active material may be covered by a coating layer. The coating layer according to an embodiment may be any suitable coating layer that is known as a coating layer for a cathode active material of an all-solid secondary battery. Examples of the coating layer include $Li_2O$—$ZrO_2$.

In addition, when the cathode active material includes a lithium salt of a ternary transition metal oxide containing nickel (Ni), such as NCA or NCM, as a cathode active material, capacity density of the all-solid secondary battery 1 may increase, which may lead to less metal dissolution of a cathode active material upon charging the battery. Therefore, the long-term reliability and cycle characteristics of the all-solid secondary battery 1 according to an embodiment upon charging may improve.

The cathode active material may be, for example, in the form of particles, such as a spherical shape or an oval-spherical shape. A particle diameter of the cathode active material is not particularly limited. The particle diameter may be within a range applicable to a cathode active material of a solid secondary battery. A content of the cathode active material of the cathode 10 is not particularly limited. The content may be within a range applicable to a cathode of a solid secondary battery.

The cathode 10 may include additives, for example, a conductive agent, a binder, a filler, a dispersing agent, and an ion conductive agent, which may be appropriately selected and combined, in addition to the cathode active material and the solid electrolyte.

Examples of the conductive agent include graphite, carbon black, acetylene black, Ketjen black, carbon fibers, a metal powder, or a combination thereof. The binder included in the cathode 10 may include, for example, styrene butadiene rubber (SBR), polytetrafluoroethylene, polyvinylidene fluoride, polyethylene, or a combination thereof. Moreover, a filler, a dispersing agent, or an ion conductive agent may be included in the cathode 10, and is any suitable material for an electrode in a solid secondary battery.

The anode 20 may include an anode current collector 21 and an anodeless coating layer 22.

The structure of the anodeless coating layer 22 according to an embodiment is shown in FIG. 2. As shown in FIG. 2, the anodeless coating layer 16 may include, for example, metal or semiconductor 14 such as silicon, and carbon 15, each of which are surrounded by or embedded in a conductive binder 13.

A thickness of the anodeless coating layer 22 may be in a range of about 1 μm to about 20 μm. The anode current collector 21 may include materials that are not reactive to lithium and do not form an alloy or a compound with lithium. Examples of materials for the anode current collector 21 include copper (Cu), stainless steel, titanium (Ti), iron (Fe), cobalt (Co), nickel (Ni), or a combination thereof. The anode current collector 21 may be, for example, formed in a plate shape or film shape.

Figure 3:
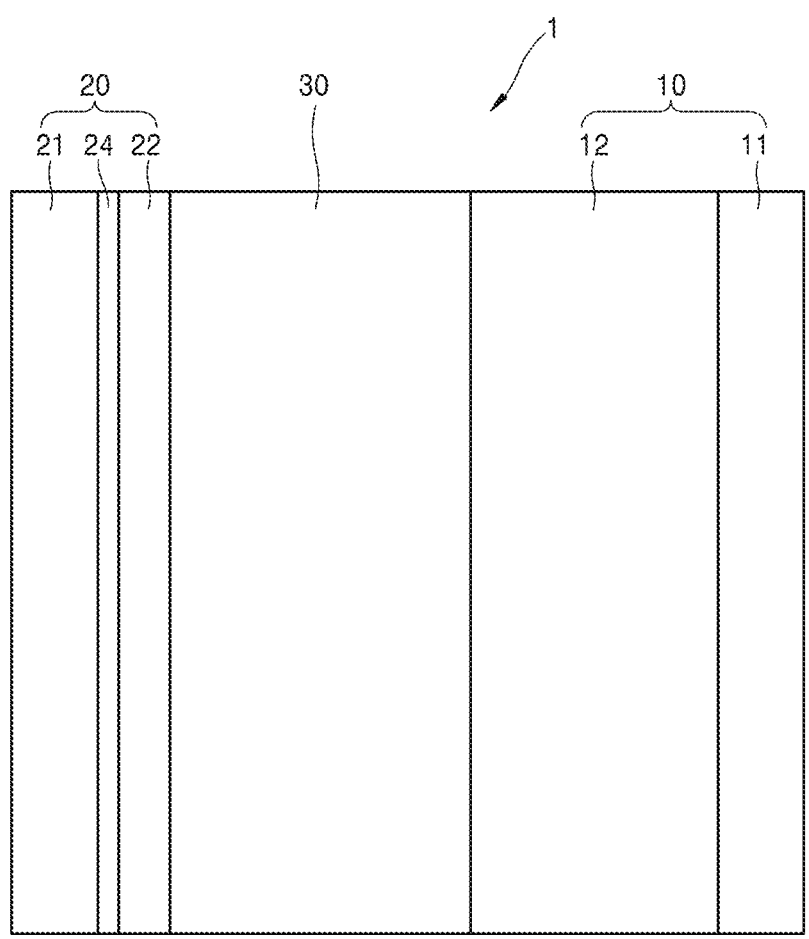
FIG. 3 is a schematic cross-sectional view of an embodiment of an all-solid battery.

As shown in FIG. 3, a thin film 24 may be formed on the anode current collector 21. The thin film 24 may include an element alloyable with lithium. Examples of an element alloyable with lithium include gold (Au), silver (Ag), zinc (Zn), tin (Sn), indium (In), silicon (Si), aluminum (Al), or bismuth (Bi). The thin film 24 may include a metal of the foregoing metals or an alloy of various combinations of the foregoing metals. Due to the presence of the thin film 24, deposition of a metal layer 23 (see, FIG. 4) may be further flattened, and characteristics of the all-solid secondary battery 1 may further improve.

A thickness of the thin film 24 is not particularly limited. The thickness may be in a range of about 1 nm to about 500 nm, or in a range of about 20 nm to about 200 nm. When a thickness of the thin film 24 is less than 1 nm, the performance of the thin film 24 may not be sufficient to improve upon a performance characteristic of the battery 1. When a thickness of the thin film 24 is greater than 500 nm, the thin film 24 may be intercalated with lithium, thus reducing a deposition amount of lithium on an anode, which may lead to deteriorating characteristics of the all-solid secondary battery 1. The thin film 24 may be formed on the anode current collector 21, for example, by using a vacuum-deposition method, a sputtering method, or a coating method.

The anodeless coating layer 22 may include an anode active material capable of forming an alloy with lithium or a compound with lithium. A capacity ratio, i.e., a ratio of a charge capacity of the cathode active material layer 12 to a charge capacity of the anodeless coating layer 22 may satisfy Equation 1.

$$0.002 < b/a < 0.5 \quad \text{Equation 1}$$

wherein, a indicates a charge capacity (mAh) of the cathode active material layer 12, and b indicates a charge capacity (mAh) of the anodeless coating layer 22.

Figure 4:
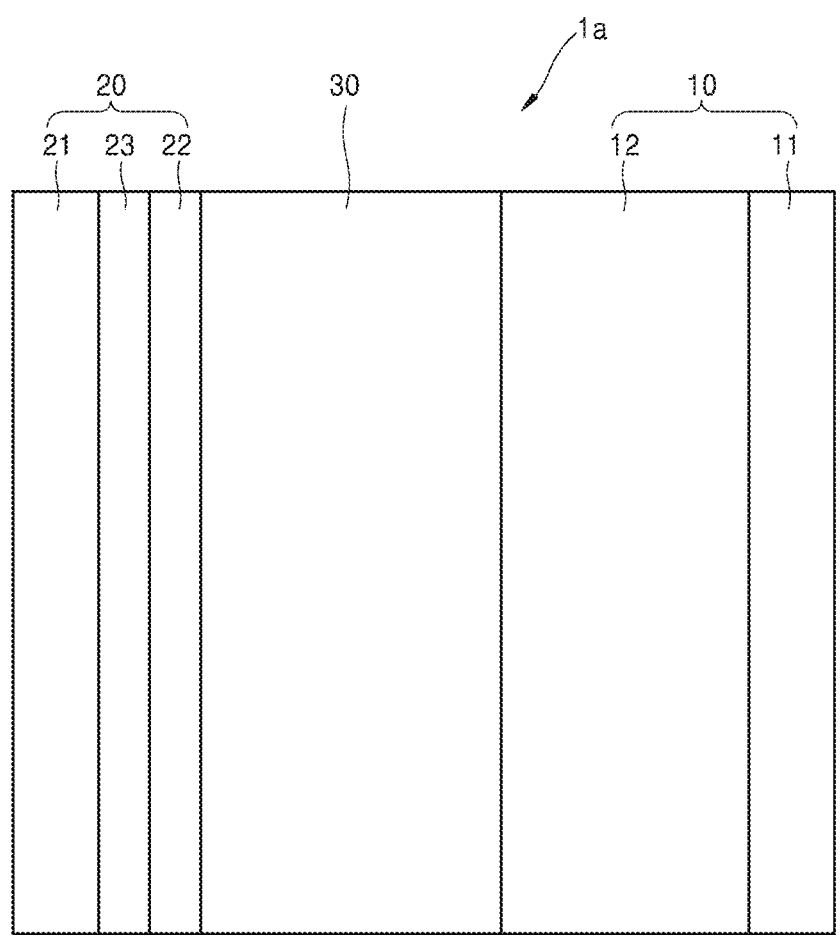
FIG. 4 is a schematic cross-sectional view of an embodiment of an all-solid battery.

A charge capacity of the cathode active material layer 12 may be obtained by multiplying a charge specific capacity (e.g., in milliampere-hours per gram (mAh/g)) of a cathode active material to a weight of the cathode active material in the cathode active material layer 12. When various cathode active materials are used, values of a charge specific capacity times weight for respective cathode active materials may be obtained. A sum of these values may be used as a charge specific capacity of the cathode active material layer 12. Likewise, a charge capacity of the anodeless coating layer 22 may also be calculated in the same manner. That is, a charge capacity of the anodeless coating layer 22 may be obtained by multiplying a charge specific capacity (mAh/g) of an anode active material to a weight of the anode active material in the anodeless coating layer 22. When various anode active materials are used, values of a charge specific capacity times weight for respective anode active materials may be obtained. A sum of these values may be used as a charge capacity of the anodeless coating layer 22. The charge specific capacity of a cathode active material, and a charge specific capacity of an anode active material, are each an estimated capacity using an all-solid half-cell in which lithium metal is used as a counter electrode. By using an all-solid half-cell, the charge capacity of each of the cathode active material layer 12 and the anodeless coating layer 22 may be directly measured. If one divides the resulting respective charge capacity by a weight of each active material, the charge specific capacity may be obtained. A charge capacity of the cathode active material layer 12 and a charge capacity of the anodeless coating layer 22 may each be an initial charge capacity measured at a 1st charging cycle. As such, according to an embodiment, a charge capacity of the cathode active material layer 12 may be much greater than a charge capacity of the anodeless coating layer 22. As follows, in an embodiment, upon charging of the all-solid secondary battery 1, the all-solid secondary battery 1 may be charged to a level exceeding a charge capacity of the anodeless coating layer 22. That is, the anodeless coating layer 22 may be overcharged. In early charging, the anodeless coating layer 22 may be intercalated with lithium. That is, the anode active material may form an alloy or a compound with lithium ions migrated from the cathode 10. As shown in FIG. 4, when charging the battery to a level exceeding the charging capacity of the anodeless coating layer 22, lithium may be deposited at a back side of the anodeless coating layer 22, i.e., at a gap between the anode current collector 21 and the anodeless coating layer 22. The metal layer 23 may result from the deposited lithium. The metal layer 23 may be mainly formed of lithium (i.e., lithium metal). This phenomenon may occur when using a specific material, i.e., an anode active material capable of forming an alloy with lithium or a compound with lithium as an anode active material. Upon discharge, lithium in the anodeless coating layer 22 and the metal layer 23 may be ionized and migrate toward the cathode 10. Thus, lithium may be used as an anode active material in the all-solid secondary battery 1. Also, the anodeless coating layer 22 may at least in part cover the metal layer 23 such that the anodeless coating layer 22 may serve as a protective layer for the metal layer 23 and may suppress deposition growth of dendrite, which may prevent short circuits and minimize deterioration capacity of the all-solid secondary battery 1, further improving characteristics of the all-solid secondary battery 1.

A capacity ratio (i.e., b/a) may be greater than 0.002:1. When the capacity ratio is 0.002:1 or less, characteristics of the all-solid secondary battery 1 may be deteriorated. The deterioration may result from insufficient performance of the anodeless coating layer 22 as a protective layer. For example, when a thickness of the anodeless coating layer 22 is overly thin, the capacity ratio may be 0.002:1 or less. In this case, when repeating charge/discharge, the anodeless coating layer 22 may collapse, and deposition growth of dendrite may occur, which may lead to deterioration of characteristics of the all-solid secondary battery 1.

Examples of the anode active material for realizing the aforementioned functions may include amorphous carbon, gold (Au), platinum (Pt), palladium (Pd), silicon (Si), silver (Ag), aluminum (Al), bismuth (Bi), tin (Sn), zinc (Zn), or a combination thereof. Examples of amorphous carbon include carbon black (CB), acetylene black (AB), furnace black (FB), Ketjen black (KB), graphene, or a combination thereof.

The anode active material included in the anodeless coating layer 22 may be used alone, or a combination of at least two anode active materials may be used. For example, the anodeless coating layer 22 may include, as an anode active material, amorphous carbon only; or gold (Au), platinum (Pt), palladium (Pd), silicon (Si), silver (Ag), aluminum (Al), bismuth (Bi), tin (Sn), zinc (Zn), or a combination thereof. In some embodiments, the anodeless coating layer 22 may include a mixture of amorphous carbon and gold (Au), platinum (Pt), palladium (Pd), silicon (Si), silver (Ag), aluminum (Al), bismuth (Bi), tin (Sn), zinc (Zn), or a combination thereof. A mixing weight ratio in the mixture of amorphous carbon to gold and the like may be, for example, in a range of about 10:1 to about 1:2, or in a range of about 5:1 to about 1:1. When the anode active material includes such materials, characteristics of the all-solid secondary battery 1 may further improve.

If gold (Au), platinum (Pt), palladium (Pd), silicon (Si), silver (Ag), aluminum (Al), bismuth (Bi), tin (Sn), zinc (Zn), or a combination thereof, is used as an anode active material, a particle size (for example, an average particle diameter) of the anode active material may be about 4 μm or less, for example, from about 0.01 μm to 4 μm, or from about 0.1 μm to 4 μm. In this case, characteristics of the all-solid secondary battery 1 may further improve. The particle diameter of the anode active material is a median diameter (D50) measured by using a laser particle-size analyzer. In the following Examples and Comparative Examples, the particle diameters were measured in this manner. A lower limit of the particle diameter is not particularly limited. The lower limit of the particle diameter may be about 10 nm.

The anode active material may include a mixture of a first particle including amorphous carbon and a second particle including metal or semiconductor. The metal or semiconductor may include, for example, gold (Au), platinum (Pt), palladium (Pd), silicon (Si), silver (Ag), aluminum (Al), bismuth (Bi), tin (Sn), or zinc (Zn). A content of the second particle may be in a range of about 8 percent by weight (wt %) to about 60 wt % or about 10 wt % to about 50 wt %, based on the total weight of the mixture. In this case, characteristics of the all-solid secondary battery 1 may further improve.

The anodeless coating layer 22 may include a block copolymer containing a conductive domain and a non-conductive domain according to an embodiment as a conductive binder.

The anodeless coating layer 22 may further include, in addition to the block copolymer, a second binder such as styrene butadiene rubber (SBR), polytetrafluoroethylene, polyvinylidene fluoride, polyethylene, and the like. The content of the second binder may be in a range of about 1 part by weight to about 30 parts by weight, based on 100 parts by weight of the total content of the binder.

When the anodeless coating layer 22 includes a conductive binder, the anodeless coating layer 22 may be stabilized on the anode current collector 21, thus improving resistance characteristics. For example, when the anodeless coating layer 22 includes a non-conductive binder, lithium ion conductivity of the anodeless coating layer 22 may be insufficient. In this regard, improvement is required.

The anodeless coating layer 22 may be prepared by providing an anode slurry, in which materials for forming the anodeless coating layer 22 are dispersed, coating an anode current collector 21 with the anode slurry, and drying the anode slurry. When a conductive binder is included in the anodeless coating layer 22, an anode active material may be stably dispersed in the dried anode slurry. Accordingly, for example, if the anode slurry is coated onto the anode current collector 21 by screen printing, screen blockage (e.g., blockage due to agglomeration of an anode active material) may be prevented. In addition, when the conductive binder is used, dispersibility may improve, as compared with a case in which a non-conductive binder such as polyvinylidene fluoride is used. Thus, preparation time for slurry may be shortened A content of the binder in the anodeless coating layer 22 may be in a range of about 0.3 parts by weight to about 15 parts by weight, for example, about 3 parts by weight to about 15 parts by weight, based on 100 parts by weight of the total content of the anode active material. When a content of the binder is in the above range, battery characteristics are improved without lowering the film strength of the anodeless coating layer. An upper limit of a thickness of the anodeless coating layer 22 is not particularly limited as long as the thickness satisfies Equation 1. A thickness of the anodeless coating layer 22 may be in a range of about 1 μm to about 20 μm. If a thickness of the anodeless coating layer 22 is in the above range, the characteristics of the entire solid secondary battery 1 exhibit significant improvement without increasing the resistance of the anodeless coating layer 22. If the foregoing binder is used, a suitable thickness of the anodeless coating layer 22 may be easily secured.

The anodeless coating layer 22 may include additives that are commonly used in solid batteries, e.g., a filler, a dispersing agent, an ion conductive agent and the like may be properly included.

The solid electrolyte 30 may include a solid electrolyte disposed between the cathode 10 and the anode 20.

The solid electrolyte may include, for example, a sulfide solid electrolyte material. Examples of the sulfide solid electrolyte material may include $Li_2S$—$P_2S_5$, $Li_2S$—$P_2S_5$—LiX (where X is a halogen atom, e.g., I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive integers and Z is Ge, Zn, or Ga), $Li_2S$—$GeS_2$, $Li_2S$—$SiS_2$—$Li_3PO_4$, or $Li_2S$—$SiS_2$—$Li_pMO_q$ (where p and q are positive integers and M is P, Si, Ge, B, Al, Ga, or In). A sulfide solid electrolyte material may be prepared by performing a melt quenching method or a mechanical milling method on a start material (e.g., $Li_2S$ or $P_2S_5$). Subsequently, heat treatment may be performed thereon. The solid electrolyte may be amorphous, crystalline, or in a state where amorphousness and crystallinity are mixed.

In some embodiments, the sulfide solid electrolyte material including at least sulfur (S), phosphorus (P), and lithium (Li) as components may be used in the solid electrolyte. For example, a sulfide solid electrolyte material including $Li_2S$—$P_2S_5$ may be used. If a material including $Li_2S$—$P_2S_5$ is used as the sulfide solid electrolyte material a mixed molar ratio of $Li_2S$ to $P_2S_5$ ($Li_2S$:$P_2S_5$) may be, for example, about 50:50 to about 90:10. The solid electrolyte 30 may further include a binder. The binder included in the solid electrolyte 30 may include, for example, styrene butadiene rubber (SBR), polytetrafluoroethylene, polyvinylidene fluoride, or polyethylene. The binder in the solid electrolyte 30 may be identical to or different from the binder included in the cathode active material layer 12 and anodeless coating layer 22.

Hereinafter, a method of manufacturing the all-solid battery 1 according to embodiment will be described in detail. The all-solid battery 1 according to an example embodiment may be manufactured by first preparing the cathode 10, the anode 20, and the solid electrolyte 30, and then stacking each of the layers as shown for example in FIG. 1.

First, materials (a cathode active material, a binder, and the like) constituting the cathode active material layer 12 may be added to a nonpolar solvent to prepare a slurry. The resulting slurry may be coated on the cathode current collector 11, followed by drying the resulting slurry. The resulting stacked cathode structure may be subjected to pressurization, for example, pressurization using a hydrostatic pressure, to provide cathode 10. The pressurization step is optional, and thus, may be omitted. Alternatively, a mixture of materials constituting the cathode active material layer 12 may be compressed to mold the cathode 10 in a pellet shape or in a sheet shape. If the cathode 10 is prepared in this manner, the cathode current collector 11 may be omitted from the cathode structure.

Anode active materials constituting the anodeless coating layer 22 and a block copolymer containing a conductive domain, and a non-conductive domain, or a combination thereof, as a conductive binder may be added to a polar solvent or a nonpolar solvent to prepare a slurry. The resulting slurry may be coated on the anode current collector 21, followed by drying the resulting slurry. The resulting stacked anode structure may be subjected to pressurization, for example, pressurization using a hydrostatic pressure, to thereby provide the anode 20. The pressurization step is optional, and thus, may be omitted.

The solid electrolyte 30 may be prepared using the solid electrolyte including a sulfide solid electrolyte material.

A sulfide solid electrolyte material may be prepared by using a melt quenching method or a mechanical milling method. For example, if using the melt quenching method, start materials (e.g., $Li_2S$, $P_2S_5$, and the like) may be mixed in a given ratio and the mixture is compressed into pellets. The pellets are reacted at a given reaction temperature in vacuum and quenched to prepare a sulfide solid electrolyte material. In this regard, a reaction temperature of the mixture of $Li_2S$ and $P_2S_5$ may be in a range of about 400° C. to about 1,000° C., for example, in a range of about 800° C. to about 900° C. A reaction time may be in a range of about 0.1 hour to about 12 hours, for example, in a range of about 1 hour to about 12 hours. In addition, a temperature during the quenching of the reactants may be 10° C. or lower, for example, 0° C. or lower, and a quenching rate may be in a range of about 1° C./sec to about 10,000° C./sec, for example, about 1° C./sec to about 1,000° C./sec.

If the mechanical milling method is used, start materials (e.g., $Li_2S$, $P_2S_5$, and the like) may be mixed in a given ratio and subjected to a reaction while stirring using e.g., a ball mill, thereby preparing a sulfide solid electrolyte material. Although the stirring rate and duration of the mechanical milling method are not particularly limited, as the stirring rate increases, a rate of production of the sulfide solid electrolyte material may increase, and as the stirring duration increases, a conversion rate of raw materials into the sulfide solid electrolyte material may increase.

The sulfide solid electrolyte material prepared by the melt quenching method or the mechanical milling method may be thermally treated at a selected temperature, and milled to prepare the solid electrolyte in particle form. In a case where the solid electrolyte has glass transition properties, the solid electrolyte may be crystalline due to the heat treatment.

The obtained solid electrolyte may be used to form the solid electrolyte 30 by any suitable known method for layer formation, such as aerosol deposition, cold spraying, or sputtering. Further, the solid electrolyte 30 may be prepared by pressurizing a solid electrolyte particle. In addition, the solid electrolyte 30 may be prepared by mixing a solid electrolyte, a solvent, and a binder followed by coating, drying, and optionally pressurizing.

The cathode 10, the anode 20, and the solid electrolyte 30 may be prepared as described above. The solid electrolyte 30 is stacked between the cathode 10 and the anode 20, followed by pressurization, for example, pressurization using a hydrostatic pressure, to provide the all-solid secondary battery 1 according to an example embodiment.

A method of charging the all-solid secondary battery 1 according to an embodiment will be described in detail. According to an embodiment, the all-solid secondary battery 1 may be charged to a level exceeding a charge capacity of the anodeless coating layer 22. That is, the anodeless coating layer 22 may be overcharged. In early charging, the anodeless coating layer 22 may be intercalated with lithium. When charging the battery to a level exceeding the charge capacity of the anodeless coating layer 22, as shown in FIG. 4, lithium may be deposited at a back side of the anodeless coating layer 22, i.e., at a gap between the anode current collector 21 and the anodeless coating layer 22. As shown in FIG. 4, a metal layer 23 results from the deposited lithium. Upon discharge, lithium in the anodeless coating layer 22 and the metal layer 23 may be ionized and migrate toward the cathode 10. In this way, lithium may be used as an anode active material in the all-solid secondary battery 1. Also, the anodeless coating layer 22 may cover the metal layer 23 such that the anodeless coating layer 22 may serve as a protective layer for the metal layer 23. Accordingly, the anodeless coating layer may suppress deposition growth of dendrites, which in turn may suppress short circuits and thus, minimize the deterioration in the capacity of the all-solid battery over time as well as further improving characteristics of the all-solid secondary battery 1.

In addition, in the first embodiment, the metal layer 23 may not be formed in advance. Thus, a preparation cost for the all-solid secondary battery 1 may be reduced. A region (interface) between the anode current collector 21 and the anodeless coating layer 22 may be a lithium (Li)-free region that does not include lithium (Li) in an initial state or a state after discharge of the all-solid secondary battery 1.

Hereinafter, referring to FIG. 4, a structure of an all-solid battery according to another embodiment will be described.

An all-solid secondary battery 1a according to another embodiment will be described in detail. As shown in FIG. 1, the all-solid battery 1a may include a cathode 10, an anode 20, and a solid electrolyte 30. The cathode 10 and the solid electrolyte 30 may be the same as those described in the above.

The anode 20 may include an anode current collector 21, an anodeless coating layer 22, and a metal layer 23. That is, in the first embodiment, the metal layer 23 may be formed between the anode current collector 21 and the anodeless coating layer 22 due to overcharging of the anodeless coating layer 22. In the second embodiment, the metal layer 23 may be formed in advance (prior to an initial charging) between the anode current collector 21 and the anodeless coating layer 22.

The anode current collector 21 and the anodeless coating layer 22 may be the same as those described in the first embodiment. The metal layer 23 may include lithium or lithium alloy. That is, the metal layer 23 may serve as a lithium reservoir. Examples of the lithium alloy include Li—Al alloy, Li—Sn alloy, Li—In alloy, Li—Ag alloy, Li—Au alloy, Li—Zn alloy, Li—Ge alloy, and Li—Si alloy. As the metal layer 23 may serve as a lithium reservoir, characteristics of the all-solid secondary battery 1a may further improve.

A thickness of the metal layer 23 may not be particularly limited. For example, a thickness of the metal layer 23 may be in a range of about 1 μm to about 200 μm. When the thickness of the metal layer 23 is in the above range, the reservoir function of the metal layer 23 is sufficiently exhibited without increasing the weight and the volume of the all solid secondary battery 1a. The metal layer 23 may be, for example, a metal foil having a thickness within this range.

A method of manufacturing the all-solid secondary battery 1a according to another embodiment will be described in detail. The cathode 10 and the solid electrolyte 30 may be manufactured in the same manner as in the first embodiment.

In the second embodiment, the anodeless coating layer 22 may be on the metal layer 23. The metal layer 23 may be substantially a metal film. It may be difficult to form a lithium foil or a lithium alloy foil on the anodeless coating layer 22. Thus, the anode 20 may be prepared as follows.

First, the anodeless coating layer 22 may be formed on a member such as a nickel plate in the same manner as in the first embodiment. In particular, a slurry may be formed by adding materials constituting the anodeless coating layer 22 to a solvent. Subsequently, the resulting slurry may be coated on the member. The resulting stacked structure may be subjected to pressurization (for example, pressurization using a hydrostatic pressure) to thereby form the anodeless coating layer 22. The pressurization may be omitted.

Subsequently, the solid electrolyte 30 may be stacked on the anodeless coating layer 22 to form a stacked structure. The stacked structure may be subjected to pressurization (for example, pressurization using a hydrostatic pressure). Then, the member may be removed. Accordingly, the stacked structure in which the anodeless coating layer 22 and the solid electrolyte 30 are stacked may be prepared.

Subsequently, a metal foil of the metal layer 23, the stacked structure of the anodeless coating layer 22 and the solid electrolyte 30, and the cathode 10 may be sequentially stacked on the anode current collector 21. The resulting stacked structure may be subjected to pressurization (for example, pressurization using a hydrostatic pressure) to thereby manufacture the all-solid secondary battery 1a.

A method of charging the all-solid secondary battery 1a according to another embodiment is the same as the method described in the first embodiment. That is, the all-solid secondary battery 1a may be charged to a level exceeding a charge capacity of the anodeless coating layer 22. That is, the anodeless coating layer 22 may be overcharged. In early charging, the anodeless coating layer 22 may be intercalated with lithium. When the anodeless coating layer 22 is charged to a level exceeding the charge capacity thereof, lithium may be deposited in the metal layer 23 (or on the metal layer 23). Upon discharge, lithium in the anodeless coating layer 22 and the metal layer 23 (or on the metal layer 23) may be ionized and migrate toward the cathode 10. Thus, lithium may be used as an anode active material in the all-solid secondary battery 1a. Also, the anodeless coating layer 22 may cover the metal layer 23 such that the anodeless coating layer 22 may serve as a protective layer for the metal layer 23. Accordingly, the anodeless coating layer may suppress deposition growth of dendrites, which in turn may suppress short circuits and thus, minimize the deterioration in the capacity of the all-solid secondary battery 1a, as well as improving characteristics of the all-solid secondary battery 1a. A charge capacity of the all-solid secondary battery 1a may be in a range of about 2 times to 500 times greater than the charge capacity of the anodeless coating layer 22.

A bulk resistance of the all-solid secondary battery 1a may be 2 ohms (Ω) or lower, and the bulk resistance of the all-solid secondary battery 1a may be about 45 percent (%) or less, for example, 0% to about 45%, or about 0.0001% to about 45%, with respect to a bulk resistance of an all-solid battery having an anodeless coating layer containing polyvinylidene fluoride.

The all-solid secondary battery 1a may have a capacity retention after 150 cycles of about 96% or greater, for example, 98% or greater based on a capacity after a $152^{nd}$ cycle relative to a capacity after a $2^{nd}$ cycle, when the all-solid battery is subjected to cycles at a voltage in a range of about 2 volts (V) to about 4.7 V at a temperature of 25° C. (vs. Li/Li+).

Figure 5:
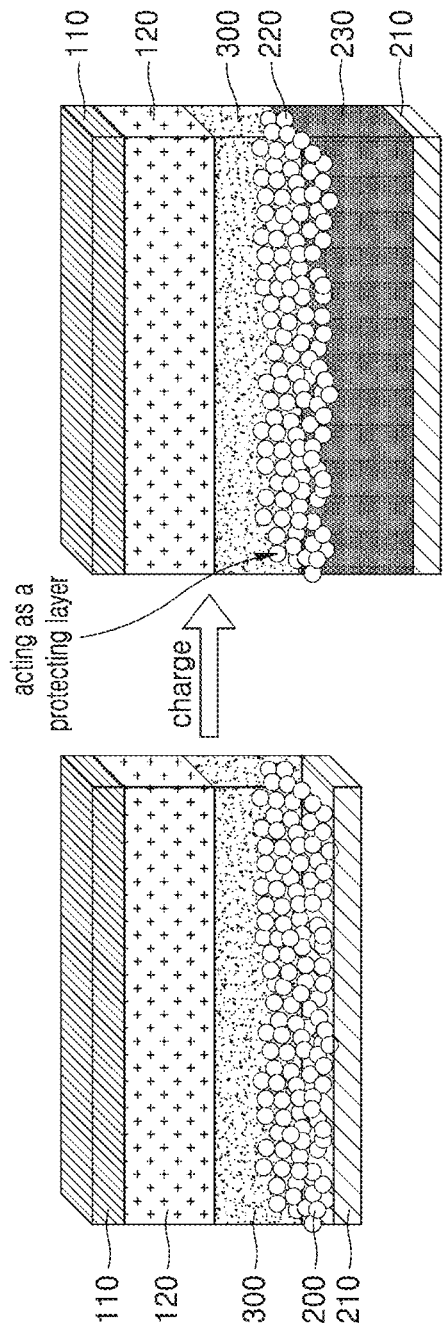
FIG. 5 is a perspective view illustrating an embodiment of a charging method of an all-solid secondary battery.

FIG. 5 is a perspective schematic view for illustrating a charging method of an all-solid secondary battery according to an embodiment.

In FIG. 5, the all-solid secondary battery includes an anode current collector 210, an anodeless coating layer 220, a solid electrolyte 300, a cathode active material layer 120, and a cathode current collector 110. The anodeless coating layer 220 may include silver and a carbon black material. In an initial state or a state after discharge of the all-solid secondary battery, lithium may not be present or not be substantially present in the anode current collector 210 and the anodeless coating layer 220. Upon charging, lithium may be deposited between the anode current collector 210 and the anodeless coating layer 220, and the deposited lithium may form a metal layer 230. The anodeless coating layer 220 may serve as a protective layer. A ratio of a charge capacity (b) of the anodeless coating layer 220 to a charge capacity (a) of the cathode active material layer 120 may satisfy 0.002<b/a<0.5. Also, the anodeless coating layer 220 may include a carbon black material layer including particles of metal, semiconductor, or a combination thereof. The particles of metal, semiconductor, or a combination thereof, may include gold (Au), platinum (Pt), palladium (Pd), silicon (Si), silver (Ag), aluminum (Al), bismuth (Bi), tin (Sn), zinc (Zn), or a combination thereof. Accordingly, characteristics of the anode may further improve. For example, furnace black (FB), acetylene black (AB), Ketjen black (KB), or graphene may be used instead of carbon black. If necessary, a metal layer may be formed prior to charging between the anode current collector 210 and the anodeless coating layer 220.

An embodiment will be described in detail by referring to Examples, however, the embodiments are not limited thereto.

EXAMPLES

Example 1: Manufacture of all-Solid Battery

An all-solid battery was manufactured as follows.
(Preparation of Cathode)
LiNi$_{0.8}$Co$_{0.15}$Mn$_{0.05}$O$_2$ (NCM) was used as a cathode active material. An argyrodite-type crystal Li$_6$PS$_5$Cl as a solid electrolyte. Polytetrafluoroethylene (i.e., a Teflon® binder available from Dupont) as a binder. Carbon nanofibers (CNF) as a conductive agent. These materials were mixed at a ratio of cathode active material:solid electrolyte: conductive agent:binder=85:15:3:1.5. The mixture was formed in a sheet shape to form a cathode sheet. The cathode sheet was compressed onto an aluminum foil as a cathode current collector having a thickness of 18 μm to provide a cathode. An initial charge capacity (a charge capacity in the 1st cycle) of the cathode was about 17 mAh while charging with a voltage of 4.1 volts (V) (about 190 mAh/g).

(Preparation of Anode)
A nickel foil having a thickness of 10 μm was prepared as an anode current collector. For an anode active material, carbon black, silver (Ag) (having a diameter of 60 nm), 5 wt % of a PS-PEO-PS block copolymer (at a mixing weight ratio of PS:PEO:PS=12:59:12 and having a weight average molecular weight of about 83,000 Daltons) were mixed. To this mixture was added N-methyl pyrrolidone (NMP) to prepare a slurry. The slurry included a mixing weight ratio of carbon black to silver (Ag) of 1:3, and a content of the PS-PEO-PS block copolymer was about 5 parts by weight based on 100 parts by weight of the total weight of the anode active material (the total weight of carbon black and silver). The NMP solvent was added such that the slurry had a viscosity suitable for use in coating using a blade coater. The slurry was coated on the nickel foil using a blade coater and then dried in the air at a temperature of 80° C. for 20 minutes. The resulting stacked structure was dried in vacuum at a temperature of 100° C. for 12 hours.

An initial charge capacity of the anode was about 0.2 mAh. Thus, b/a was about 0.012 in Equation 1, and the b/a value satisfied Equation 1.

(Solid Electrolyte)

A solid electrolyte $Li_6PS_5Cl$ was used as a solid electrolyte.

(Preparation of all-Solid Battery (Pouch Cell))

The cathode, the solid electrolyte, and the anode were sealed as a laminating film in a vacuum completing the manufacture of an all-solid secondary battery. A portion of the cathode current collector and a portion of the anode current collector protruded out of the laminating film such that the all-solid secondary battery maintained the vacuum state. These protruding portions were used as terminals for the cathode and the anode. The all-solid battery was subjected to treatment with hydraulic pressure of 4 megapascals (MPa) for 30 minutes. The treatment is hydrostatic pressurization, which further improves characteristics of the all-solid battery.

Examples 2 and 3

All-solid batteries were manufactured in substantially the same manner as in Example 1, except that contents of the PS-PEO-PS block copolymer were 0.3 parts by weight (Example 2) and 15 parts by weight (Example 3), respectively, based on 100 parts by weight of the total content of the anode active material upon a manufacture of an anode.

Example 4

An all-solid battery was manufactured in substantially the same manner as in Example 1, except that a weight average molecular weight of a PS-PEO-PS block copolymer (at a mixing weight ratio of PS:PEO:PS=10:37:10) was changed to 57,000 Daltons, for the manufacture of the anode.

Example 5

An all-solid battery was manufactured in substantially the same manner as in Example 1, except that an anode active material of carbon black and silicon (having a particle diameter of 1 μm) at a weight ratio of 1:3, respectively, was used instead of the anode active material of carbon black and silver (Ag), at a weight ratio of 1:3, respectively.

Reference Example 1

An all-solid battery was manufactured in substantially the same manner as in Example 1, except that polyvinylidene fluoride was used instead of the PS-PEO-PS block copolymer.

Evaluation Example 1: Scanning Electron Microscope (SEM) Analysis

The all-solid battery manufactured in Example 1 was subjected to a treatment in a thermostatic bath at temperature of 60° C. In the 1st cycle, the all-solid battery was charged with a constant current of 0.5 milliampere per square centimeter ($mA/cm^2$) until the voltage reached 4.25 V. Then, until the current reached 0.2 mA, the battery was charged with a constant voltage of 4.25 V. Then, the battery was discharged with a constant current of 0.5 $mA/cm^2$ until the voltage reached 2.0 V.

Figure 6:
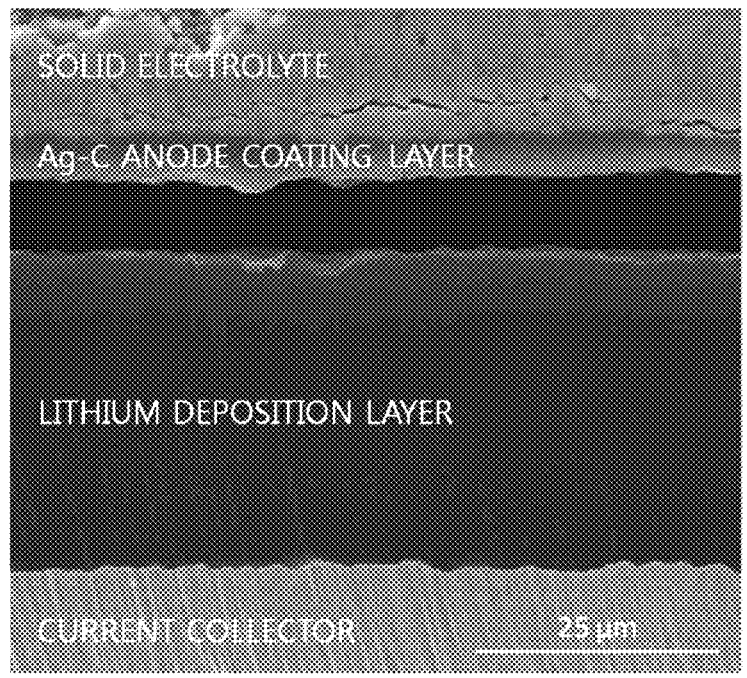
FIG. 6 is a scanning electron microscope (SEM) image of a cross-section of an all-solid battery of Example 1 after charging.

Subsequently, the battery was disassembled in a dry environment, and a cross-section of the all-solid battery was polished using an ion milling apparatus. Then, the cross-section was observed using a scanning electron microscope (SEM). As shown in FIG. 6, lithium deposits at an interface between the current collector and Ag—C anode coating layer due to charging.

Evaluation Example 2: Charge/Discharge Characteristics

Charge/discharge characteristics of the all-solid batteries manufactured in Example 1 and Reference Example 1 were evaluated.

In the $1^{st}$ cycle, the all-solid battery was charged with a constant current of 0.68 $mA/cm^2$ until the voltage reached 4.25 V. Then, until the current reached 0.2 mA, the battery was charged with a constant voltage of 4.25 V. Then, the battery was discharged with a constant current of 0.68 $mA/cm^2$ until the voltage reached 2.5 V. In the $2^{nd}$ cycle and after the $2^{nd}$ cycle, the battery was charged with a constant current of 3.4 $mA/cm^2$ until the voltage reached 4.25 V. Then, the battery was discharged with 3.4 $mA/cm^2$ until the voltage reached 2.5 V. The charge/discharge evaluation of the all-solid secondary batteries was performed in a thermostatic bath at temperature of 60° C.

Figure 7:
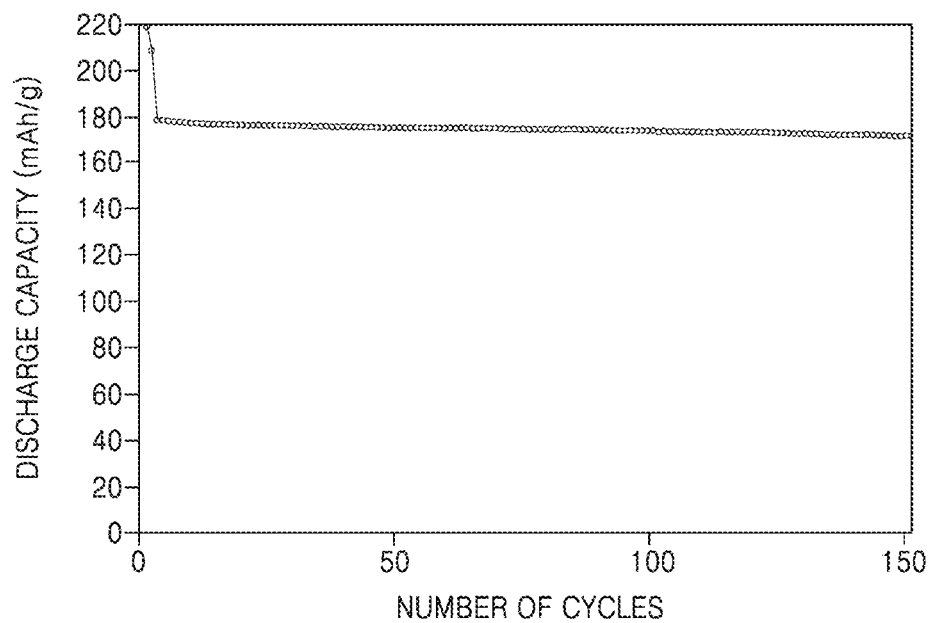
FIG. 7 is a graph of discharge capacity (milliampere-hours per gram (mAh/g)) versus number of cycles showing the change in discharge capacity of the all-solid battery of Example 1.
Figure 8:
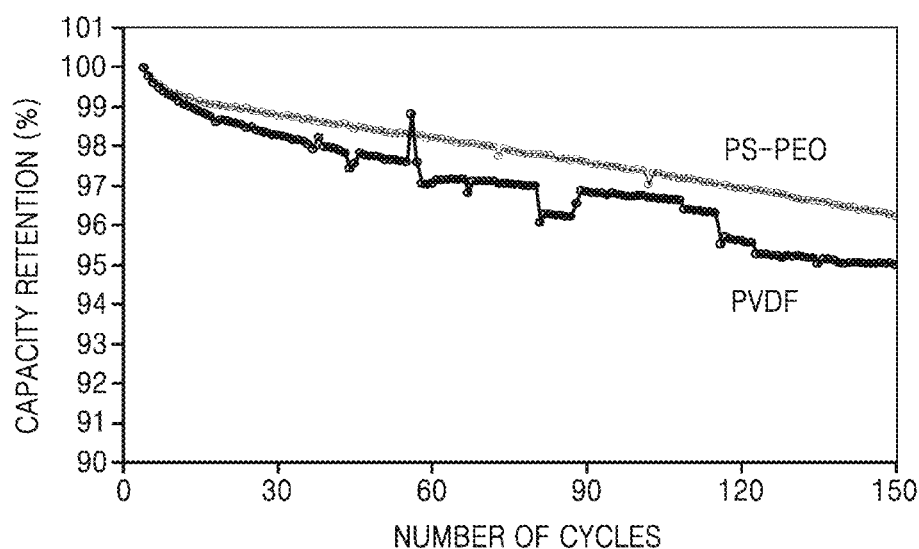
FIG. 8 is a graph of capacity retention (%, percent) versus number of cycles showing the change in capacity retention of all-solid batteries manufactured in Example 1 and Reference Example 1.

Among the charge/discharge characteristics, the change in discharge capacity of the all-solid battery of Example 1 over a number of cycles is shown in FIG. 7, and the changes in capacity retention of the all-solid batteries of Example 1 and Reference Example 1 are shown in FIG. 8.

Referring to FIGS. 7 and 8, the all-solid battery of Example 1 maintained a capacity retention of 96% during 150 cycles, as compared with the all-solid battery of Reference Example 1, thereby improving the capacity retention. The all-solid battery of Example 1 maintained its excellent discharge capacity characteristics during 150 charge/discharge cycles, as shown in FIG. 7.

Evaluation Example 3 Rate Capability

The rate capabilities of the all-solid batteries (lithium batteries) were evaluated as follows.

Each of the all-solid batteries manufactured in Example 1 and Reference Example 1 was charged with a constant current of 0.1 C rate at a temperature of about 25° C. until the voltage reached 4.25 V (vs. Li), and a constant voltage of 4.25 V (constant voltage mode) was maintained until a cutoff current of 0.05 C rate was reached. Subsequently, each of the batteries was discharged with a constant current of 0.1 C rate until the voltage reached 2.5 V (vs. Li) (formation process, $1^{st}$ cycle).

Each of the all-solid batteries that underwent the $1^{st}$ cycle was charged with a constant current of 1.0 C rate until the voltage reached 4.35 V (vs. Li), and a constant voltage of 4.35 V (constant voltage mode) was maintained until a cutoff current of 0.05 C rate was reached. Subsequently, each of the batteries was discharged with a constant current of 0.2 C rate until the voltage reached 2.8 V (vs. Li) (formation process, $2^{nd}$ cycle).

Each of the all-solid batteries that underwent the $2^{nd}$ cycle was charged with a constant current of 0.33 C rate until the voltage reached 4.35 V (vs. Li), and a constant voltage of 4.35 V (constant voltage mode) was maintained until a cutoff current of 0.05 C rate was reached. Subsequently, each of the batteries was discharged with a constant current of 0.33 C rate until the voltage reached 2.8 V (vs. Li) ($3^{rd}$ cycle).

Each of the all-solid batteries that underwent the $3^{rd}$ cycle was charged with a constant current of 0.33 C rate until the voltage reached 4.35 V (vs. Li), and a constant voltage of 4.35 V (constant voltage mode) was maintained until a cutoff current of 0.05 C rate was reached. Subsequently, each of the batteries was discharged with a constant current of 1 C rate until the voltage reached 2.8 V (vs. Li) (4th cycle).

Each of the all-solid batteries that underwent the 4th cycle was charged with a constant current of 0.33 C rate until the voltage reached 4.25 V (vs. Li), and a constant voltage of 4.25 V (constant voltage mode) was maintained until a cutoff current of 0.05 C rate was reached. Subsequently, each of the batteries was discharged with a constant current of 1 C rate until the voltage reached 2.5V (vs. Li) ($5^{th}$ cycle). These cycles were repeated for 150 cycles under the same conditions.

During all these charge/discharge cycles, after one charge/discharge cycle, the evaluation was paused for 10 minutes.

Some of the charge/discharge test results are shown in Table 1. Rate capability was defined by Equation 2.

Rate capability [%]=[Discharge capacity at the $4^{th}$ cycle (1 C rate)]/[Discharge capacity at the $3^{rd}$ cycle (0.33 C rate)]×100%  Equation 2

TABLE 1

| Classification | Rate capability (%) |
|---|---|
| Example 1 | 95.5 |
| Reference Example 1 | 94.9 |

As shown in Table 1, the all-solid battery of Example 1 was found to have improved rate capability as compared with that of Reference Example 1.

Evaluation Example 4: Resistance Characteristics

The resistance of each of the all-solid batteries of Example 1 and Reference Example 1 was measured by using an impedance analyzer (Solartron 1260A Impedance/Gain-Phase Analyzer) at a temperature of about 25° C., according to the 2-probe method. The amplitude was about ±10 millivolts (mV), and the frequency range was in a range of about 0.1 Hertz (Hz) to about 1 megahertz (MHz).

Figure 9:
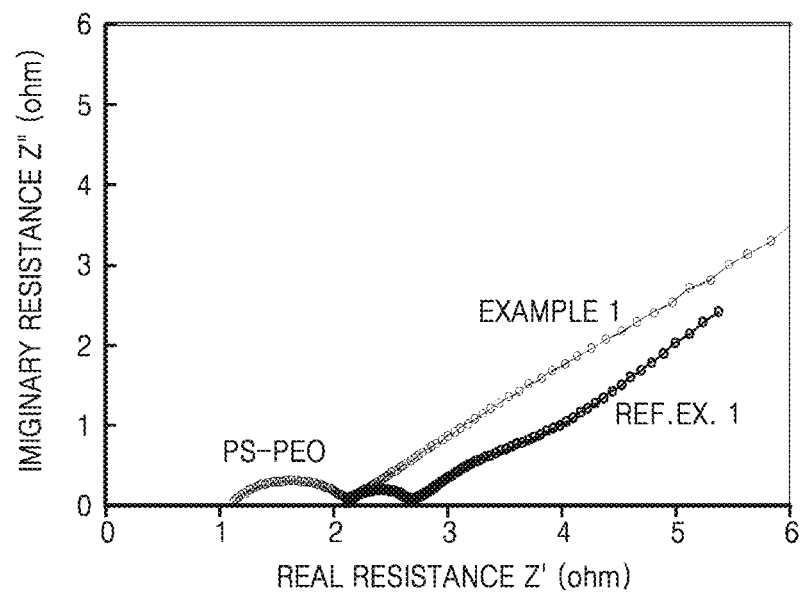
FIG. 9 is a graph of imaginary resistance (Z" (ohm)) versus real resistance (Z' (ohm)) showing the resistance characteristics of the all-solid batteries manufactured in Example 1 and Reference Example 1.

Nyquist plots obtained from the impedance measurements that were performed after 24 hours from the manufacture of the all-solid batteries of Example 1 and Reference Example 1 are shown in FIG. 9.

As shown in FIG. 9, it was found that the all-solid battery of Example 1 had a smaller interfacial resistance than that of Reference Example 1.

Evaluation Example 5: Evaluation of Binding Force

A 180° peel strength test regarding the binding force of the anodeless coating layer to the current collector was performed on each of the all-solid batteries of Example 1 and Reference Example 1 using a universal testing machine (UTM, available from Instron) according to ASTM D903-49. In the test, upon peeling at a speed of 305 millimeters per minute (mm/min), the energy value of each sample was measured for 5 times each, and the average value of the values was obtained. The evaluation results of peel strength are listed in Table 2.

TABLE 2

| Classification | Peel strength (Mn/mm) |
|---|---|
| Example 1 | 21 |
| Reference Example 1 | 21 |

As shown in Table 2, the all-solid battery of Example 1 was found to have a binding force similar as that of Reference Example 1.

While various embodiments are set forth in the foregoing description; however, the embodiments should be construed as illustrative of specific examples, rather than as limiting the scope of the disclosure. For example, one of ordinary skill in the art may understand that the all-solid secondary battery and the charging method may vary with reference to FIGS. 1 to 9. For example, it will be appreciated that the spirit and the principle of the disclosure may be applied to a partial-solid secondary battery instead of the all-solid secondary battery, a secondary battery using a partial-liquid electrolyte, or a battery other than a lithium battery. Therefore, the scope of the disclosure is not to be determined by the Examples described above but by the spirit and scope as defined by the following claims.

As apparent from the foregoing description, characteristics of an all-solid battery may improve when using lithium as an anode active material.

It should be understood that embodiments described herein should be considered in a descriptive sense only and not for purposes of limitation. Descriptions of features or aspects within each embodiment should typically be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:
1. An all-solid battery comprising:
a cathode comprising a cathode current collector and a cathode active material layer;
an anode current collector;
an anodeless coating layer on the anode current collector, and
a solid electrolyte disposed between the cathode active material layer and the anodelss coating layer;
wherein the anodeless coating layer includes an anode active material capable of forming an alloy with lithium or a compound with lithium, and a binder comprising a block copolymer including a conductive domain, and optionally, a non-conductive domain,
wherein the conductive domain comprises an ion-conductive repeating unit, a mixture of a crosslinked network phase and a polymer comprising an ion-conductive repeating unit, a polymer comprising an electron-conductive repeating unit, or a combination thereof;
wherein the anode active material is dispersed within the binder.

2. The all-solid battery of claim 1, wherein the ion-conductive repeating unit is polyethylene oxide, polysilsesquioxane, poly(ethylene glycol)methyl ether methacrylate, polysiloxane, polypropylene oxide, polymethyl methacrylate, polyethyl methacrylate, polydimethyl siloxane, polyacrylic acid, polymethacrylic acid, polymethyl acrylate, polyethyl acrylate, poly(2-ethylhexyl acrylate), polybutyl methacrylate, poly2-ethylhexyl methacrylate, polydecylacrylate, polyethylene vinylacetate, polyimide, polyamine, polyamide, polyalkyl carbonate, polynitrile, polyphosphazine, or a combination thereof.

3. The all-solid battery of claim 1, wherein the electron-conductive repeating unit is polyaniline, polypyrrole, poly(3,4-ethylenedioxythiophene), a poly(3,4-ethylenedioxythiophene:poly(styrene sulfonate)), or a combination thereof.

4. The all-solid battery of claim 1, wherein the binder includes non-conductive domain, wherein the non-conductive domain is a structural domain, a rubber domain, an olefin domain, a structural domain comprising an organic-inorganic silicon structure, or a combination thereof.

5. The all-solid battery of claim 4, wherein the structural domain comprises a structural block of a block copolymer comprising a plurality of structural repeating units, and wherein structural block of the block copolymer comprises is at least one of
i) polystyrene, hydrogenated polystyrene, polymethacrylate, poly(methyl methacrylate), polyvinyl pyridine, polyvinyl cyclohexane, polyimide, polyamide, polyethylene, polyisobutylene, polybutylene, polypropylene, poly(4-methyl pentene-1), poly(butylene terephthalate), poly(isobutyl methacrylate), poly(ethylene terephthalate), polydimethyl siloxane, polyacrylonitrile, polymaleic acid, poly maleic anhydride, polymethacrylic acid, poly(tertbutylvinyl ether), poly(cyclohexyl methacrylate), poly(cyclohexyl vinyl ether), polyvinylidene fluoride, polydivinyl benzene, or a combination thereof, or ii) a copolymer comprising at least two repeating units of the aforementioned polymers.

6. The all-solid battery of claim 4, wherein the rubber domain comprises a rubber block comprising a plurality of rubber repeating units, and the rubber block is polyisoprene, polybutadiene, polychloroprene, polyisobutylene, polyurethane, or a combination thereof.

7. The all-solid battery of claim 4, wherein the olefin domain comprises an olefin block comprising a plurality of olefin repeating units, wherein the olefin repeating unit is polyethylene, polybutylene, polyisobutylene, polypropylene, or a combination thereof.

8. The all-solid battery of claim 1, wherein the block copolymer comprises the ion-conductive domain and a structural domain, and a content of the ion-conductive domain in the block copolymer is in a range of about 55 parts by weight to about 80 parts by weight, based on 100 parts by weight of the block copolymer.

9. The all-solid battery of claim 8, wherein the block copolymer is
a block copolymer comprising a polystyrene first block and a second block comprising polyethylene oxide;
a block copolymer comprising the polystyrene first block, the second block comprising polyethylene oxide, and a polystyrene third block;
a block copolymer comprising the polystyrene first block and a second block comprising polysilsesquioxane;
a block copolymer comprising the polystyrene first block, the second block comprising polysilsesquioxane, and the polystyrene third block;
a block copolymer comprising the polystyrene first block and a second block comprising poly(ethylene glycol) methyl ether methacrylate;
a block copolymer comprising the polystyrene first block, the second block comprising poly(ethylene glycol) methyl ether methacrylate, and the polystyrene third block;
a block copolymer comprising the polystyrene first block and a second block comprising polysiloxane;
a block copolymer comprising the polystyrene first block, the second block comprising polysiloxane, and the polystyrene third block;
or a combination of the block copolymers.

10. The all-solid battery of claim 1, wherein a ratio of a charge capacity of the cathode active material layer to a charge capacity of the anodeless coating layer satisfies Equation 1:

$$0.002 < b/a < 0.5 \qquad \text{Equation 1}$$

wherein, in Equation 1, a indicates a charge capacity of the cathode active material layer, and b indicates a charge capacity of the anode active material layer.

11. An all-solid battery comprising:
a cathode comprising a cathode current collector and a cathode active material layer;
an anode current collector;
the anodeless coating layer on the anode current collector; and
a solid electrolyte disposed between the cathode active material layer and the anodeless coating layer;
wherein the anodeless coating layer includes an anode active material capable of forming an alloy with lithium or a compound with lithium, and a binder;
wherein a ratio of a charge capacity of the cathode active material layer to a charge capacity of the anodeless coating layer satisfies Equation 1

$$0.002 < (b/a) < 0.5 \qquad \text{Equation 1}$$

wherein, in Equation 1, a is a charge capacity of the cathode active material layer, and b is a charge capacity of the anodeless coating layer.

12. The all-solid battery of claim 11, wherein a content of the binder is in a range of about 0.3 parts by weight to 15 parts by weight, based on 100 parts by weight of a total content of the anode active material.

13. The all-solid battery of claim 1, wherein a thickness of the anodeless coating layer is in a range of about 1 micrometer to about 20 micrometers.

14. The all-solid battery of claim 1, wherein the anode active material is in a form of particles having an average particle diameter of about 0.01 micrometers to about 4 micrometers.

15. The all-solid battery of claim 1, wherein the anode active material comprises amorphous carbon, gold, platinum, palladium, silicon, silver, aluminum, bismuth, tin, zinc, or a combination thereof.

16. The all-solid battery of claim 1, wherein the anode active material comprises amorphous carbon.

17. The all-solid battery of claim 1, wherein the anode active material comprises gold, platinum, palladium, silicon, silver, aluminum, bismuth, tin, zinc, or a combination thereof.

18. The all-solid battery of claim 1, wherein the anodeless coating layer comprises amorphous carbon, silver, silicon, a lithium alloy thereof, or a complex thereof.

19. The all-solid battery of claim 1, wherein the anode active material comprises a mixture of a first particle and a second particle, wherein the first particle comprises amorphous carbon, and the second particle comprises a metal, a semiconductor, or a combination thereof, wherein a content of the second particle is in a range of about 8 percent by weight to about 60 percent by weight, based on a total weight of the mixture.

20. The all-solid battery of claim 1, further comprising a film comprising an element alloyable with lithium is provided on the anode current collector, wherein the film is disposed between the anode current collector and the anodeless coating layer.

21. The all-solid battery of claim 1, further comprising a metal layer between the anode current collector and the anodeless coating layer.

22. The all-solid battery of claim 21, wherein the metal layer between the anode current collector and the anodeless coating layer comprises lithium or a lithium alloy.

23. The all-solid battery of claim 1, wherein a region between the anode current collector and the anodeless coating layer is a lithium-free region that does not comprise lithium in an initial state or a state after discharge of the all-solid battery.

24. The all-solid battery of claim 1, further comprising a metal layer between the anode current collector and the solid electrolyte, wherein the metal layer comprises lithium or a lithium alloy.

25. The all-solid battery of claim 1, wherein
a bulk resistance of the all-solid battery is about 0.1 ohms to about 2 ohms, and
the bulk resistance of the all-solid battery is about 45 percent or less, with respect to a bulk resistance of an all-solid battery having an anodeless coating layer comprising polyvinylidene fluoride.

26. The all-solid battery of claim 1, wherein the all-solid battery has a capacity retention after 150 cycles of about 96 percent or greater, based on a capacity after a $152^{nd}$ cycle relative to a capacity after a $2^{nd}$ cycle, when the all-solid battery is cycled between 2.5 volts vs Li/Li$^+$ to 4.7 volts vs Li/Li$^+$ at a temperature of 25° C.

27. The all-solid battery of claim 1, wherein the solid electrolyte is a sulfide electrolyte.

* * * * *